(12) United States Patent
Hauck et al.

(10) Patent No.: US 6,448,563 B1
(45) Date of Patent: Sep. 10, 2002

(54) APPARATUS FOR THE PHOTO-INITIATED CHEMICAL CROSS-LINKING OF MATERIAL

(75) Inventors: Roland Hauck, Hohenfels-Deutwang; Stefan Bickert, Überlingen, both of (DE)

(73) Assignee: Novartis AG, Basel (CH)

( * ) Notice: Subject to any disclaimer, the term of this patent is extended or adjusted under 35 U.S.C. 154(b) by 0 days.

(21) Appl. No.: 09/367,274
(22) PCT Filed: Feb. 19, 1998
(86) PCT No.: PCT/EP98/00962
§ 371 (c)(1),
(2), (4) Date: Oct. 28, 1999
(87) PCT Pub. No.: WO98/36889
PCT Pub. Date: Aug. 27, 1998

(30) Foreign Application Priority Data

Feb. 21, 1997 (DE) .......................................... 197 06 846

(51) Int. Cl.[7] .............................................. B23K 26/18
(52) U.S. Cl. ................ 250/373; 250/504 R; 250/492.1; 250/365; 264/1.38; 204/157.15
(58) Field of Search .......................... 250/504 R, 492.1, 250/373, 365; 264/1.38; 204/157.15

(56) References Cited

U.S. PATENT DOCUMENTS 5,296,673 A * 3/1994 Smith .................... 219/121.68
5,928,575 A * 7/1999 Buazza ...................... 264/1.38

* cited by examiner

Primary Examiner—Bruce Anderson
Assistant Examiner—Nikita Wells
(74) Attorney, Agent, or Firm—R. Scott Meece; Jian S. Zhou; Richard T. Gearhart

(57) ABSTRACT

The invention relates to an apparatus for the photo-initiated chemical cross-linking of material (28). To form one or more mouldings the material is enclosed in an optically transparent mould (26). The apparatus has at least one light source (12), for example a pulsed UV light source by which the material (28) can be acted upon by a light that triggers the cross-linking. The region to be cross-linked in the mould (26) is determined at least partially by beam-delimiting elements (20, 22) between the light source (12) and the mould (26). That can be achieved by arranging between the light source (12) and the mould (26) a mask (20) having transparent and non-transparent surface portions. The mask (20) is then projected onto the material (28) that is enclosed in the mould (26) by projection optics (24). The projection of the mask (20) onto the material is effected in a telecentric beam path.

4 Claims, 2 Drawing Sheets

APPARATUS FOR THE PHOTO-INITIATED CHEMICAL CROSS-LINKING OF MATERIAL

The invention relates to an apparatus for the photo-initiated chemical cross-linking of material that is enclosed in an optically transparent mould for the formation of one or more mouldings, which apparatus has at least one light source by which the material can be acted upon by a light that triggers the cross-linking.

In the chemical cross-linking of material, the molecular structure of the material is altered by the joining of chains of molecules. The material may undergo macroscopic changes during the process, for example it may change from one state of aggregation to a different state of aggregation, for example from the liquid state to the solid state. The cross-linking can be effected, for example, by irradiation with electromagnetic waves (here generally referred to as light). In order to trigger the process, the photons must have a certain minimum energy, with the result that, typically, light in the ultraviolet (UV) wave range is used.

When such a liquid material is enclosed in an optically transparent moulding tool, a chemical process that causes cross-linking in the material can be triggered by exposure to light. The material then becomes solid and retains the shape of the moulding tool. The material moulded in that manner is then removed from the moulding tool, solid mouldings of the desired shape being obtained.

When a mould is used in which a plurality of mouldings are to be produced, it is expedient for those mouldings to be joined to one another in the mould. The liquid material that is to be cross-linked can then be introduced at one site on the mould and is then able to distribute itself and fill up the entire mould. Problems occur, however, when the individual mouldings are to be separated from one another after cross-linking. The parting sites often need to be processed thereafter, for example polished. The same problem occurs also in the case of only one moulding since the site at which the material to be cross-linked is introduced often leaves traces on the moulding itself.

The problem underlying the invention is so to form the beam path in an apparatus of the type mentioned in the introduction that the light that triggers the cross-linking assists in the formation of the outline of the moulding(s).

The problem underlying the invention is especially so to form the beam path in an apparatus of the type mentioned in the introduction that the surfaces of the moulding(s) that are parallel to the optical axis of the apparatus are determined by the beam path of the light that triggers the cross-linking.

According to the invention, that problem is solved in that the region(s) to be cross-linked in the mould is/are determined at least partially by beam-delimiting elements between the light source and the mould. As a result, the region to be cross-linked can be actively controlled.

Such a beam-delimiting element may be, for example, a mask having transparent and non-transparent surface portions which is arranged between the light source and the mould, the mask being projected onto the material that is enclosed in the mould by projection optics.

A specific desired pattern is defined by the mask. That pattern then determines the radial shape of the moulding(s), relative to the optical axis of the apparatus. Even if the size of the mould is greater in that radial direction, the material outside the pattern is not cross-linked and can simply be rinsed off the moulding(s) after the moulding(s) has/have been removed.

Preferably, the light source should deliver as uniform as possible a flow of energy through the desired volume of the material to be cross-linked and the total energy or intensity should be high enough for the chemical process to be completed within as short a time as possible, enabling a good economically viable yield within a production process.

The light source may be optically approximately in point form and condenser optics may be so arranged between the light source and the mask that a largely homogeneous illumination of the mask is obtained. That measure is known and is not discussed in greater detail here.

The apparatus may be so constructed that the projection of the mask onto the material is effected in a telecentric beam path. The telecentric beam path may be either on the object-side side or on the image-side. An object-side telecentric beam path is defined as a beam path where the entrance pupil of the optical system lies at infinity, that is to say the exit pupil coincides with the image focal point. An image-side telecentric beam path is defined as a beam path where the exit pupil of the optical system lies at infinity, that is to say the entrance pupil coincides with the object focal point. When the telecentric beam path is on the image-side, the size of the image does not depend upon the position of the image. In the present invention that is highly advantageous since the mouldings to be formed have a certain extent in the direction of the optical axis of the system. Side surfaces of the mouldings that extend parallel to the optical axis do not, as a result, suffer any curvature during cross-linking. Out-of-focus effects as a result of varied distance and material thickness are minimised.

The light source may be a pulsed UV light source (flashlamp). The cw high performance halogen lamps (cw=continuous wave) that are typically used as light source, which take up a substantial amount of space, have an electrical output in the range of a few kW and are expensive, have a high rate of wear-and-tear, require complicated electrical control and have a low UV yield. A pulsed light source has a very high UV component combined with a distinctly lower average electrical output. That stems from the fact that the UV component is a function of the plasma temperature of the arc and the total electrical output is restricted by the material of the lamps (average thermal load limit). In pulsed lamps the incandescent plasma is substantially hotter, that is to say there are distinctly higher outputs within the individual light pulse. In such lamps, the thermal shock resistance of the lamp is the only limiting factor for the output in the individual pulse. The average electrical output is, on the other hand, low (for example a few watts). Such lamps are also cheaper. Typically, pulsed lamps achieve 200 to 300 times the UV component of cw-operated lamps.

A further advantage of pulsed lamps is that, owing to the lower electrical output, their construction volume is smaller. As a result, they can easily be integrated into an optical system and can be arranged closely together with the optical system in groups.

The pulsed-mode operation also enables exact dimensioning of the amount of irradiation in multiples of the individual pulses by simply counting the pulses per projector.

A retroreflector may be arranged behind the mould, as viewed from the light source The integration of a retroreflector into the beam path after the active volume has been irradiated causes the light to be projected through the desired volume again. Since, typically, only a small proportion is absorbed (that is to say, triggers the desired chemical reaction) in a single passage of the beam, the degree of efficiency of the overall arrangement is almost doubled. Moreover, the projection back into the projector lamp massively increases the plasma temperature of the discharge, which results in a desired intensification of the UV component in the emission spectrum.

For the selection of a suitable energy range, either optical filters may be integrated into the mask, or the collimator, projection optics or moulding tool may be appropriately selectively transparent.

As a result of the present invention, inter alia the exposure to light is homogeneous over relatively large surface areas and, moreover, can be altered individually in fixed portions of the total surface area, which is especially important in the case of multiple processing (that is to say when a plurality of mouldings lie adjacent to one another in a mould) and when small mouldings are being produced.

An embodiment of the invention is illustrated hereinafter in greater detail with reference to the accompanying drawings, in which.

Figure 1:
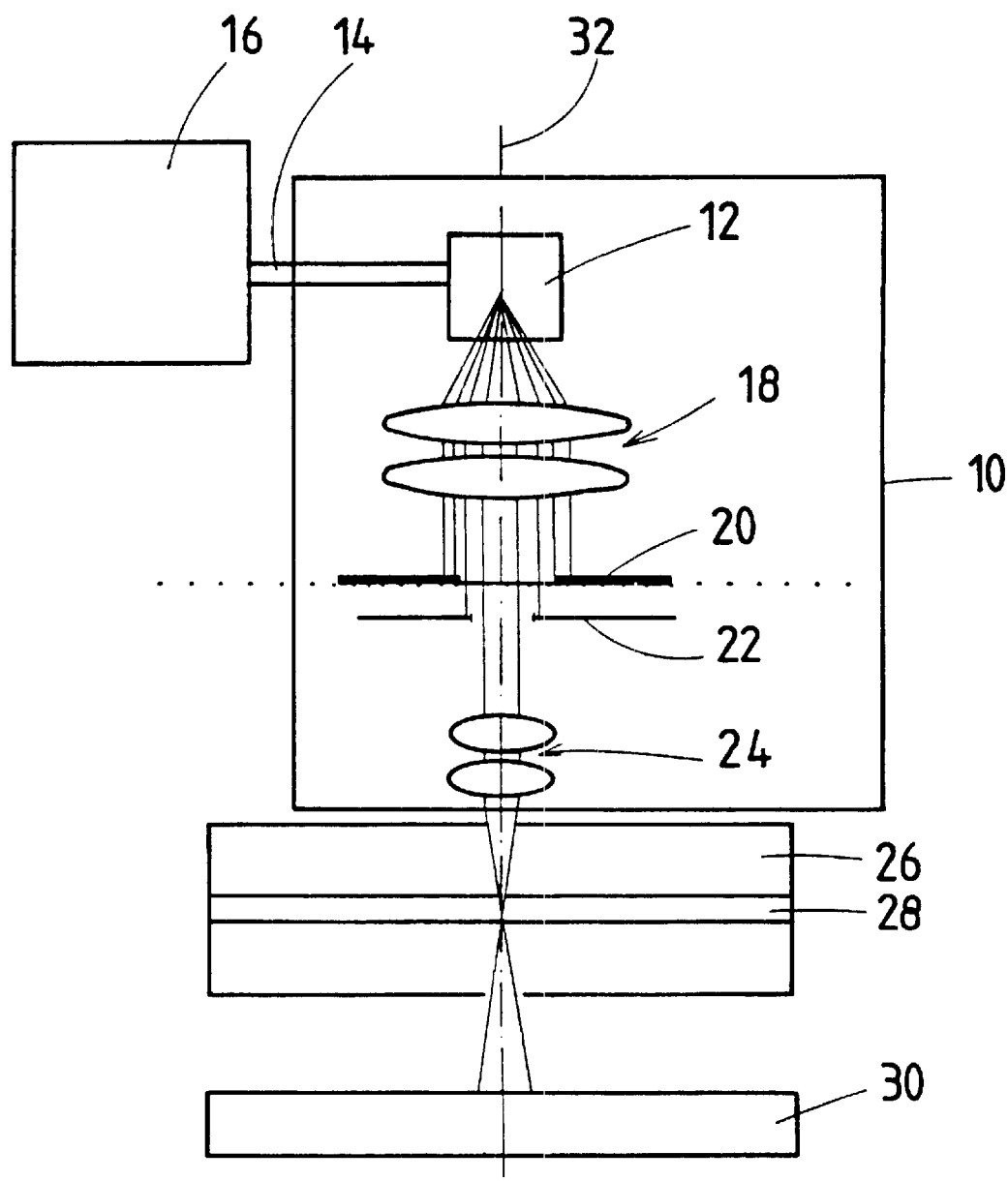
FIG. 1 is a diagrammatic representation of an embodiment of the invention.

In FIG. 1 a projector is denoted by the reference numeral 10. The projector 10 contains a light source in the form of a flashlamp 12. The flashlamp 12 is connected by way of leads 14 to an electrical control 16 comprising a pulse counter. In the projector 10 there are arranged in the beam path of the flashlamp 12, in succession, collimator optics 18, a mask 20 in the form of a transparency, a stop 22 and projection optics 24. The stop 22 is arranged in the object focal plane of the projection optics 24.

The projector 10 is so arranged that it exposes to light a moulding tool 26. Enclosed in the moulding tool is the material 28 that is to be exposed to light and cross-linked.

A retroreflector 30 is arranged behind the moulding tool 26, as viewed from the projector 10.

The optical axis of the apparatus is denoted by the reference numeral 32. When a plurality of projectors are used, such an optical axis 32 is associated with each projector. Reference to the optical axis 32, then, applies accordingly to each individual projector.

The stop 22 is so arranged in the projector 10 that it defines the entrance pupil. The stop 22 forms the aperture stop for the projection optics. An image-side telecentric beam path is produced as a result, which means that even relatively thick material 28, that is to say material of large extent parallel to the optical axis 32, can be exposed to light well without distortion in the depth. Moreover, a greater margin for manoeuvre in respect of the distance between the projector 10 and the moulding tool 26 is possible without there being any negative effect on the outcome of the cross-linking.

As a result of the control 16 having a pulse counter, it is possible in simple manner to control the flow of energy through the material 28 that is to be cross-linked.

For greater clarity, in FIG. 1 only one projector 10 is shown. It should, however, be mentioned expressly that the present invention is not limited to the use of a single projector 10. Rather, it will be expedient to use a plurality of projectors. If, for example, an arrangement of 4×5 mouldings is to be exposed to light with sharp definition in a transparent moulding tool, there may be used, for example, 20 identically constructed projectors having pulsed light sources and an average electrical output of approximately 40 W. The mouldings to be produced may be identical and, for example, may each have a diameter radially to the optical axis of 15 mm. The apparatus may be so operated that the intensity reaches an average of 10 mW/cm$^2$ over a period of a few seconds. The masks 20 used may be metal masks which are projected into the moulding tool. An estimation of the exposure intensity gives the following values:

| process | degree of efficiency | output used |
| --- | --- | --- |
| flashlamp 10 W electrical output | 70% | 7 W |
| collecting optics and projector | 25% | 1.75 W |
| usable UV component | 3% | 52 mW |
| retroreflector | 190% | 100 mW |
| total output | 1% | |
| output in active volumes per moulding | | 56 mW/cm$^2$ |

The total electrical output required in that Example is a maximum of 200 W from 20 individual lamps each of 10 W. In order to satisfy those requirements with known shadow-throwing technology and cw lamps, it is necessary to use lamps having an electrical output of ≧2.5 kW.

Figure 2:
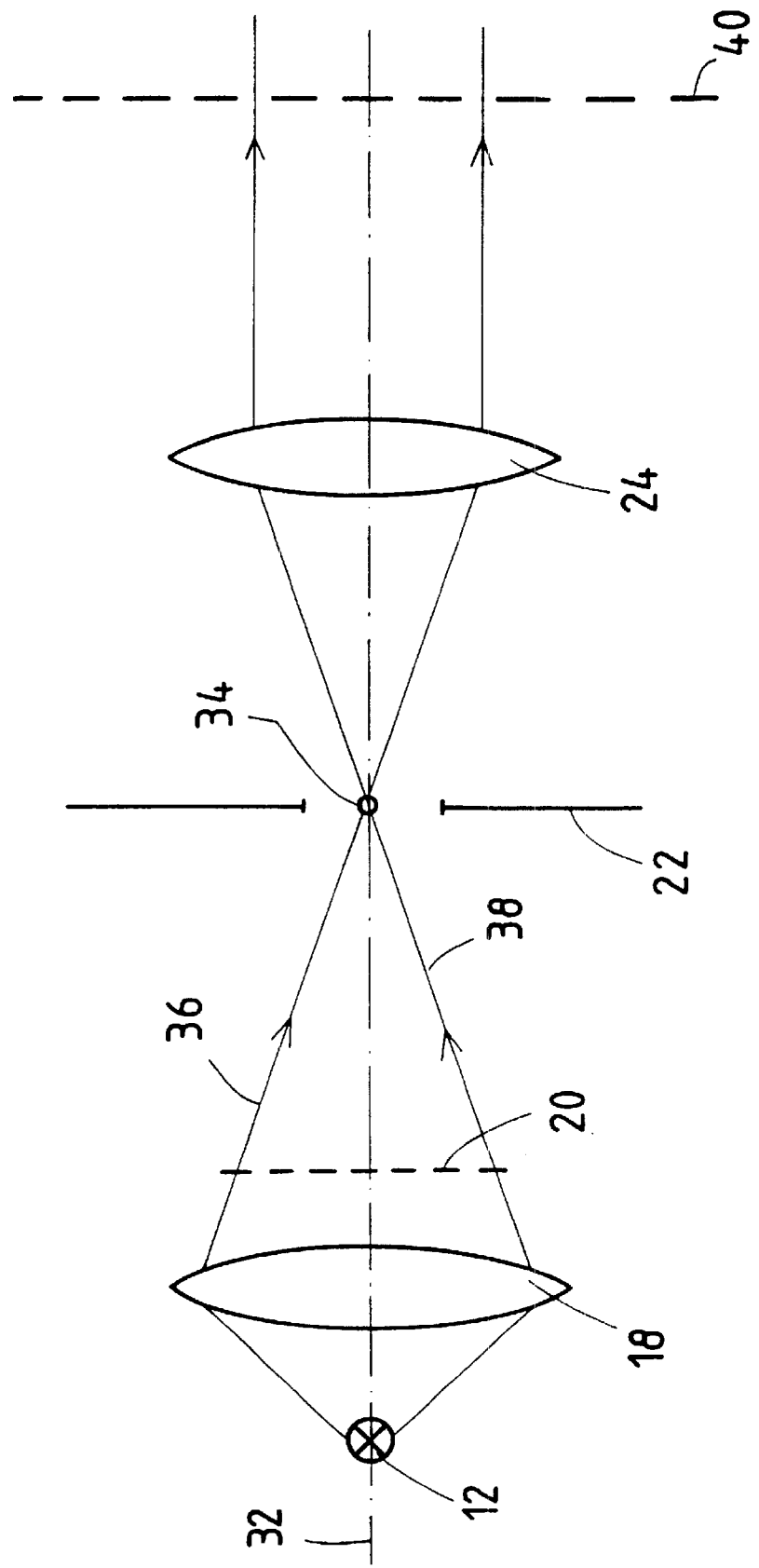
FIG. 2 is a diagrammatic representation of an arrangement of the optical elements for producing an image-side telecentric beam path.

The image-side telecentric beam path will now be described with reference to FIG. 2. Corresponding parts in FIG. 2 are provided with the same reference numerals as in FIG. 1.

Arranged in succession on the optical axis 32 are the light source 12, the collimator optics 18, the mask 20, the aperture stop 22 and the projection optics 24. The aperture stop 22 is arranged in the object focal plane of the projection optics 24. An image-side telecentric beam path is produced as a result. Two beams are denoted by the reference numerals 36 and 38. The projection optics 24 project the mask 20 into an image plane 40. A sharp image of the mask 20 is obtained in that image plane 40. Owing to the telecentric beam path there is obtained, both in front of and behind the image plane 40, an image of the mask 20 which, whilst not being sharp, does not, however, differ, or differs only insubstantially, in size from the size of the image in the image plane 40.

The collimator optics 18 project the light source 12 in the plane of the aperture stop 22. That is indicated by a small circle 34. A so-called interlinked or interwoven beam path is obtained in that manner, which effects good illumination of the mask 20.

What is claimed is:

1. An apparatus for the photo-initiated chemical cross-linking of material that is enclosed in an optically transparent mould for the formation of a moulding, comprising:

a light source by which the material can be acted upon by light that triggers the cross-linking, said light source being optically approximately in point form;

a mask having transparent and non-transparent surface portions;

condenser optics that are arranged between the light source and the mask in a manner so that a largely homogeneous illumination of the mask is obtained; and a projection optics for projecting the mask onto the material enclosed in the mould in an image-side telecentric beam path, wherein the region to be cross-linked in the mould is determined by the projection of the mask by the projection optics onto the material enclosed in the mould in the image-side telecentric beam path, thereby delimiting the radial shape of the moulding.

2. An apparatus according to claim 1, wherein a retroreflector is arranged behind the mould, as viewed from the light source.

3. An apparatus according to claim 1, wherein the light source is a pulsed UV light source.

4. An apparatus according to claim 3, wherein a retroreflector is arranged behind the mould, as viewed from the light source.

* * * * *